ized in the United States Patent [19]

Yu et al.

[11] 3,944,631
[45] Mar. 16, 1976

[54] ACRYLATE-STYRENE-ACRYLONITRILE COMPOSITION AND METHOD OF MAKING THE SAME

[75] Inventors: Arthur J. Yu, Stamford, Conn.; Ruth E. Gallagher, Dobbs Ferry, N.Y.

[73] Assignee: Stauffer Chemical Company, Westport, Conn.

[22] Filed: Feb. 1, 1974

[21] Appl. No.: 438,918

[52] U.S. Cl. ............... 260/881; 260/884; 260/885; 260/886
[51] Int. Cl.$^2$ .................. C08L 25/12; C08L 29/06; C08L 31/02; C08L 33/20
[58] Field of Search ..................................... 260/881

[56] References Cited
UNITED STATES PATENTS

| | | | |
|---|---|---|---|
| 3,041,307 | 6/1962 | Baer | 260/881 |
| 3,655,826 | 4/1972 | Fellmann et al. | 260/881 |

FOREIGN PATENTS OR APPLICATIONS

| | | | |
|---|---|---|---|
| 1,900,346 | 1/1969 | Germany | 260/881 |

Primary Examiner—Murray Tillman
Assistant Examiner—Thurman K. Page
Attorney, Agent, or Firm—Richard P. Fennelly

[57] ABSTRACT

An impact-resistant and weatherable thermoplastic composition comprising from about 10 to about 50 weight percent of a crosslinked acrylate elastomer having a Tg of less than 25°C., from about 5 to about 35 weight percent of a crosslinked styrene-acrylonitrile copolymer and from about 15 to about 85 weight percent of a non-crosslinked or linear styrene-acrylonitrile copolymer. The composition is made by a three-step sequence comprising emulsion polymerizing of an alkyl acrylate containing at least one crosslinking monomer, emulsion polymerizing a monomer mixture of styrene, acrylonitrile and at least one crosslinking monomer in the presence of the crosslinked acrylate elastomer formed in the previous step, or a reverse sequence of the prior two emulsion polymerization procedures, and, finally, emulsion or suspension polymerizing of styrene, acrylonitrile in the presence of the previously formed product.

28 Claims, No Drawings

ACRYLATE-STYRENE-ACRYLONITRILE COMPOSITION AND METHOD OF MAKING THE SAME

DESCRIPTION OF THE INVENTION

The present invention is an acrylate-styrene-acrylonitrile polymer (hereinafter abbreviated "ASA") which has good impact and superior weather durability compared to acrylonitrilebutadiene-styrene (ABS) polymers.

ABS polymers will age in outdoor applications and therefore find only limited use. The aging is partly due to the effect ultraviolet rays have upon the residual unsaturation. In order to solve this problem it has been proposed that butadiene in the ABS materials be replaced with a more light stable monomer. One recent suggestion for such a modification is contained in *Kunststoffe*, Vol. 60 (Sept. 1970), pp. 617–622 (English version: pp. 4–5 (blue)) wherein an ASA polymer ("Luran S") is described as containing an acrylic ester, and styrene-acrylonitrile and being apparently formed by the distribution of an acrylic elastomer in the form of very fine particles in a forming phase and being thereafter bonded to the hardening component by grafted styrene-acrylonitrile chains. Other examples of recent attempts to form impact resistant grafted thermoplastics are given in Japanese Pat. Nos. 72/30, 751 and 73/7264, German Offenlegungsschrift No. 2,140,437, and U.S. Pat. No. 3,711,575.

The composition of the present invention contains little grafting and is formed by a three-step process. The use of a crosslinked acrylic elastomer, as exemplified in the present invention, is contrary to the teachings of some U.S. patents including U.S. Pat. Nos. 3,041,307; 3,041,308; and 3,041,309 which employ non-crosslinked, acrylic elastomers. The crosslinking of the acrylate elastomer before attachment of the elastomers to the crosslinked styrene-acrylonitrile layer is contrary to U.S. Pat. No. 3,517,084 which crosslinks the elastomer after polymerization of the elastomer to a thermoplastic polymer by means of the addition of organic peroxides and a post-polymerization heating procedure. This gives a process which is difficult to control and reproduce.

Briefly, the present invention is described as follows. The process comprises the steps of emulsion polymerizing at least one alkyl acrylate monomer in the presence of from about 0.05% to about 10% by weight of a polyfunctional crosslinking monomer to form an aqueous latex of crosslinked acrylic elastomer particles, thereafter emulsion polymerizing a charge of styrene and acrylonitrile monomers in the presence of a crosslinking agent and the crosslinked latex particles to crosslink the styreneacrylonitrile charge, and thereafter adding a monomeric charge of styrene and acrylonitrile which does not contain a crosslinking agent but which does contain an initiator to polymerize the monomers and form a linear styrene-acrylonitrile polymer. The final product that is formed has impact and weather resistance and comprises from about 10 to 50% by weight of the crosslinked acrylic elastomer, from about 5 to 35% by weight of the crosslinked styrene-acrylonitrile copolymer surrounding and penetrating the crosslinked acrylic elastomer, and from about 15 to 85% by weight of the polymerized linear styreneacrylonitrile.

In greater detail, now, the elastomer particles which are utilized in preparing the particles of this invention are made by means of conventional aqueous emulsion procedures well known to those skilled in the art of using emulsifiers and water soluble catalysts.

Thus, in conducting the aqueous emulsion polymerization step leading to the preparation of these elastomer particles, there is preferably first prepared a monomer charge comprising an aqueous emulsion containing about 10 to 50%, by weight, of one or more monomers, the identity of which will be described in detail hereinbelow, and from 0.2 to 2.0% by weight of a suitable emulsifier. From about 0.05 to 2.0% by weight of the monomer mixture, of a water-soluble catalyst, such as ammonium, sodium or potassium persulfate, hydrogen peroxide or a redox system, such as a mixture of a persulfate with an alkali metal bisulfite, thiosulfate or hydrosulfite, is introduced, and the mixture is then heated at a temperature of from about 40° to 95°C. for a period of about 0.5 to 8 hours.

The acrylic elastomer particles used in preparing the particles of this invention comprise crosslinked acrylic polymers or copolymers having a Tg, i.e., a glass transition temperature, of less than about 25°C. which can be polymerized by means of free radical initiated emulsion techniques. These acrylic elastomer particles should be crosslinked so that they can retain their size and shape during subsequent polymer processing steps. This crosslinking can be achieved during the polymerization of the elastomer if a polyfunctional ethylenically unsaturated monomer is included in the polymerization recipe. As used in this disclosure, the term "crosslinked" denotes a polymer which at ambient temperatures is substantially insoluble in such organic solvents as tetrahydrofuran or cyclohexanone.

Examples of acrylic elastomers that can be used include the crosslinked polymers of the $C_2$–$C_{10}$ alkyl acrylate and the $C_8$–$C_{22}$ alkyl methacrylate monomers, preferably the $C_4$–$C_8$ alkyl acrylates, such as poly(n-butyl acrylate), poly(ethyl acrylate) and poly(2-ethyl hexylacrylate). At least one acrylate monomer is utilized in this step. If desired, the monomer charge may contain small amounts, i.e., 1% to 20% by weight of the amount acrylate monomer, of optional monomers including styrene, acrylonitrile, methacrylonitrile, methyl methacrylate, methacrylic acid, acrylic acid, vinylidene chloride, vinyl toluene and any other ethylenically unsaturated monomer copolymerizable with the acrylate monomer selected for use.

In order to crosslink the acrylate monomer from about 0.05% to about 10% by weight (preferably 0.1% to 5%) based on the weight of acrylate monomer, of at least one crosslinking agent is used. This crosslinking agent is for the purposes of this invention a di- or polyfunctional ethylenically unsaturated monomer having at least one vinyl group of the formula:

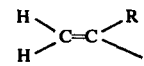

wherein R is hydrogen or lower alkyl. As is well known in the art the vinyl groups on the crosslinking monomer can be the same (e.g. divinyl benzene, trimethylol propane triacrylate, etc.) or different, (e.g., allyl methacrylate, diallyl fumarate, diallyl maleate, etc.) Examples of other suitable crosslinking monomers which are known to persons in the art and which can be used are 1,3-butylene dimethacrylate, diethylene glycol dimethacrylate, ethylene glycol dimethacrylate, trimethylolpropane trimethacrylate, methylene bisacrylamide, diethylene glycol diacrylate, ethylene glycol diacrylate, divinyl ether, diallyl phthalate, divinyl sulfone, divinyl sorbitol, triethylene glycol dimethacrylate, trimethylene glycol diacrylate, butylene glycol diacrylate, pentamethylene glycol diacrylate, glyceryl triacrylate, octylene glycol diacrylate, trimethylolpropane triacrylate, the tetraacrylate ester of pentaerythritol and various diallyl phosphonates.

Optimum results are obtained by the use of a crosslinked copolymer containing from about 95 to 99.9% by weight of n-butyl acrylate and from about 0.1 to 5%, by weight, of butylene glycol diacrylate.

The emulsifier which is used is at least one of the following conventional types: an anionic emulsifier, e.g., the $C_2$–$C_{22}$ carboxylic acids, the sulfates or, sulfonates, of $C_6$–$C_{22}$ alcohols or alkyl phenols; a non-ionic emulsifier, e.g., the addition products of alkylene oxides to fatty acids, amines or amides; a combination of the foregoing anionic and non-ionic emulsifiers; or the cationic emulsifiers, e.g., a quaternary ammonium containing compound. The amount of emulsifier should be present from about 0.5% to about 5% by weight in the emulsion.

Moreover, in a preferred embodiment of the process of this invention, it has been found that regardless of the particular emulsifier being utilized in preparing the rubber polymer latex, its polymerization in large scale commercial equipment is greatly facilitated by introducing the monomer charge to the system in several portions over a period of from 1 to 3 hours. Thus, where this is not done and the total monomer charge is introduced in one portion, the resulting exothermic polymerization reaction often becomes virtually uncontrollable leading to overheating which, in turn, may set up, i.e., coagulate, the resulting polymer latex. However, by dividing the monomer charge and introducing it in about several portions, the resulting polymerization reaction remains controllable and overheating and coagulation can be prevented.

An initiator is also present in the emulsion in an amount ranging from about 0.005% to 2% by weight of the acrylate monomer. Suitable for use are water-soluble peroxidic compounds, e.g., hydrogen peroxide and alkali metal and ammonium persulfates, oil soluble organic peroxides and azo compounds, e.g., benzoyl peroxide, azobisisobutyronitrile and the like, used singly or in combination. Redox catalysts, e.g., mixtures of peroxidic catalysts with reducing agents, such as hydrazine, alkali metal bisulfites, thiosulfates, and hydrosulfites, and soluble oxidizable sulfoxyl compounds can also be used.

A chain transfer agent such as an alkyl mercaptan, e.g., t-dodecyl mercaptan, toluene, xylene, chloroform, halogenated hydrocarbons and the like may also be used.

A buffer to keep the pH at 7.0 or higher is a final component of the emulsion.

The next step in the preferred embodiment of preparing the polymer of the present invention is the emulsion polymerization of a mixture of styrene and acrylonitrile in the presence of a minor portion of at least one difunctional or polyfunctional crosslinking monomer to form a crosslinked styrene-acrylonitrile polymer. This emulsion polymerization is carried out in the presence of the crosslinked acrylic elastomer by adding the styrene-acrylonitrile charge to the previously prepared aqueous emulsion of crosslinked acrylate elastomer.

The amount of styrene-acrylonitrile which is added ranges from 5 to 35% of the weight of the final product that will be produced whereas the crosslinked acrylate elastomer is present from about 10% to 50% based upon the weight of the final product which will be formed.

The monomer charge of styrene-acrylonitrile can comprise from about 50/50 to 85/15 weight parts of styrene to acrylonitrile with the preferred ratio being 76/24. If desired, minor amounts e.g., below about 20% by weight, of optional monomers can be included. Examples are t-butyl styrene, p-chlorostyrene, $\alpha$-methyl styrene, methyl methacrylate, alkyl acrylate, vinylidene chloride, ethylene, propylene, isobutylene and other ethylenically unsaturated compounds copolymerizable with styrene and acrylonitrile.

The crosslinking agent, emulsifiers, initiators and chain transfer agents discussed in the previous step can also be used in this step in the same amounts to form the crosslinked styrene-acrylonitrile on crosslinked acrylate elastomer.

If desired, the two steps described above may be reversed in sequence.

After the emulsion polymerization of the crosslinked styrene-acrylonitrile polymer onto the crosslinked acrylic elastomer or the reverse sequence of these two steps has been accomplished, the final step of the present invention is performed. This is the formation of a linear styrene-acylonitrile polymer which is not substantially grafted onto the crosslinked acrylic elastomer-crosslinked styrene-acrylonitrile copolymers. The amount of linear styrene-acrylonitrile polymer which is grafted is less than 30 weight percent, preferably less than 20 weight percent. This third step may be accomplished by either suspension or emulsion polymerization of a charge of styrene and acrylonitrile monomers having the same general composition as the styrene and acrylonitrile charge used in the previous step in the absence of a crosslinking monomer. The combined amounts of styrene and acrylonitrile utilized in this step will vary from 15–85% by weight of the final product. The same emulsifiers, initiators, chain transfer agents and optional monomers utilized in previous steps may be used in this final polymerization procedure.

If suspension polymerization is chosen the suspending agent can be methyl cellulose, hydroxyethyl cellulose, hydroxypropyl cellulose, carboxymethyl cellulose, talc, clay, polyvinyl alcohol, gelatine and the like. Preferred for this purpose is hydroxypropyl methyl cellulose which should, preferably, have a viscosity of at least about 3,000 and, preferably, about 15,000 cps. as determined, at 20°C., with a 2%, by weight, aqueous solution of the polymer in a Ubbelohde viscometer according to ASTM Procedures D-1347-64 and D-2363-65T.

Other additives can be used in forming the linear styrene-acrylonitrile matrix to confer desired properties upon the final product. Included are conventional light, thermal and ultraviolet light stabilizers, antioxidants, dyes, pigments, mineral additives and fillers and reinforcing agents.

The following examples show preferred embodiments of the process of the claimed invention and the product formed therefrom:

EXAMPLE 1

A crosslinked polybutylacrylate latex suitable for use in this invention was formed by placing the reactants listed in Table I in a one quart bottle which was then flushed with nitrogen, capped and heated, while being rotated, for 3 hours at 70°C.

and "crosslinked styrene-acrylonitrile," respectively. DVB refers to "divinyl benzene," which is the crosslinking agent.

TABLE II

| Sample | Description | $H_2O$ (g) | Aerosol TR (1% Soln) (ml) | $NaHCO_3$ (1% Soln) (ml) | $K_2S_2O_8$ Catalyst (2% Soln) (ml) | Prep. 1 (g) | Styrene Monomer (g) | Acrylonitrile Monomer (g) | t-dedecyl mercaptan (g) | Divinyl Benzene (g) |
|---|---|---|---|---|---|---|---|---|---|---|
| Prep. 2 | 6:1 XBA:XSAN (0.3% DVB) | 90 | 15 | 15 | 10 | 397 | 14.0 | 5.2 | — | 0.096 |
| Prep. 3 | 3:1 XBA:XSAB (0.5% DVB) | 126 | 15 | 15 | 15 | 345 | 25.2 | 9.3 | — | 0.173 |
| Prep. 4 | 2:1 XBA:XSAN (0.5% DVB) | 147 | 15 | 15 | 15 | 307 | 33.6 | 12.4 | — | 0.23 |
| Prep. 5 | 3:1 XBA:SAN (0% DVB) | 126 | 15 | 15 | 15 | 345 | 25.2 | 9.3 | 0.045 | — |

Note:
The above formulations gave good emulsions with low coagulation levels. Prep. 5 does not contain a crosslinked styrene-acrylonitrile copolymer. Its inferior impact characteristics of the product prepared therefrom are shown in Table VII.

TABLE I

| Reactant | Amount |
|---|---|
| Butyl Acrylate | 180 g |
| Butylene glycol diacrylate | 0.45 g |
| Bis-tridecyl ester of sodium sulfosuccinic acid (Aerosol TR, 1% solution) | 54 ml. |
| $K_2S_2O_8$ (2% solution) | 20 ml. |
| $NaHCO_3$ (1% solution) | 20 ml. |
| $H_2O$ | 326 ml. |

The latex product that was produced had a solids content of about 30% and will be referred to hereinafter as Preparation 1. It was used in Example 2, described below, to produce the crosslinked styrene-acrylonitrile on crosslinked acrylate elastomer.

EXAMPLE 2

A series of interpolymers comprising crosslinked styrene-acrylonitrile copolymers on crosslinked polybutylacrylate elastomers were prepared by placing the reactants listed below in Table II in a one quart bottle which was flushed with nitrogen, capped, heated and rotated at 70°C. for 2½ hours. The abbreviations XBA and XSAN refer to "crosslinked butyl acrylate"

Table III present the solubility data for the products isolated from the latices, Prep. 1–5, by coagulation and drying to a constant weight. The solvent is methyl ethyl ketone (MEK):

TABLE III

| Samples | Description | % Solids In Latex | % Solubles in MEK | % Gel | Calc. % of SAN which was Crosslinked |
|---|---|---|---|---|---|
| Prep. 1 | XBA | 30 | 8.2 | 91.8 | — |
| Prep. 2 | 6:1 XBA:XSAN | 25.9 | 13 | 87 | 57 |
| Prep. 3 | 3:1 XBA:XSAN | 25.6 | 14 | 86 | 68 |
| Prep. 4 | 2:1 XBA:XSAN | 25.9 | 15 | 85 | 71 |
| Prep. 5 | 3:1 SBA:SAN | 25.6 | 29 | 71 | — |

EXAMPLE 3

The suspension polymerization of linear styreneacrylonitrile (i.e., styrene and acrylonitrile monomers) in the presence of the crosslinked styrene-acrylonitrile on crosslinked polybutylacrylate elastomer to form the final product of the claimed invention was performed. A one quart bottle was used as a reaction vessel and each of the reactants listed in Table IV were added. The bottle was rotated at 70°C. for 10 hours.

TABLE IV

| Samples | Description* | $H_2O$ (g) | 1% Aqueous Methocel** (g) | VAZO+ (g) | Seed++ | Gms. of Seed | Styrene (g) | Acrylonitrile (g) | t-dodecyl Mercaptan (g) |
|---|---|---|---|---|---|---|---|---|---|
| Prep. 6 | 65 LSAN/5XSAN/30XPBA | 280 | 50 | 0.1 | Prep. 2 | 112 | 38 | 14 | 0.067 |
| Prep. 7 | 60 LSAN/10XSAN/30XPBA | 270 | 50 | 0.1 | Prep. 3 | 128 | 35 | 13 | 0.062 |
| Prep. 8 | 55 LSAN/15XSAN/30XPBA | 260 | 50 | 0.1 | Prep. 4 | 144 | 32 | 12 | 0.060 |
| Prep. 9 | 60 LSAN/10SAN/30XPBA | 270 | 50 | 0.1 | Prep. 5 | 128 | 35 | 13 | 0.062 |

*LSAN = Linear styrene-acrylonitrile; all ratios are in wt. %.
**Methocel = Hydroxypropyl methyl cellulose suspending agent - viscosity: 90 HG, 15,000 cps.
+VAZO = Azobisisobutyronitrile. An initiator of polymerization.
++Seed = The XBA:XSAN resins are listed in Table II. The number given in Table IV identifies the particular latex chosen from that table.
The above reactants produced suspensions with a slightly milky effluent being obtained. About 0.25% BHT (butylated hydroxy toluene) was added as an emulsion and the samples were air dried.

Table V sets forth the analysis of some of the samples listed in Table IV.

TABLE V

| Samples | Description | % C | % H | % N |
|---|---|---|---|---|
| Prep. 6 | 65 LSAN/5XSAN/30XPBA | 79.52 | 8.06 | 4.35 |
| Prep. 7 | 60 LSAN/10XSAN/30XPBA | 79.50 | 8.13 | 4.31 |
| Prep. 9 | 60 LSAN/10SAN/30XPBA | 79.47 | 8.25 | 4.45 |

TABLE V-continued

| Samples | Description | % C | % H | % N |
|---|---|---|---|---|
| | | 79.34 | 7.96 | 4.35 |

EXAMPLE 4

Rather than preparing the final product by suspension polymerization, as in Example 3, the products of the present invention were prepared by emulsion polymerization. Table VI shows the reactants that were placed in a one quart reaction bottle, were flushed with nitrogen and heated to 70°C., for 3½ hours while being rotated. The product was 60 LSAN/10XSAN/30X-PBA.

TABLE VI

| Component | Amount |
|---|---|
| $H_2O$ | 92 g |
| $K_2S_2O_8$ (2% solution) | 20 ml. |
| Aerosol TR (1% solution) | 20 ml. |
| $NaHCO_3$ (10% solution) | 15 ml. |
| Seed (Prep. 3)* | 220 g |
| Styrene | 60.5 g |
| Acrylonitrile | 22.4 g |
| t-dodecyl mercaptan | 0.108 g |

*Indicates the line number in Table II which identifies the XSAN/XPBA latex.

The emulsion was satisfactory and had no odor or coagulation. About 0.25% BHT was added as an emulsion. This emulsion is designated as Prep. 10. The solids content was 24%. The calculated analytical result of the coagulated and dried resin were: 77.89% C; 7.89% H and 4.47% N.

EXAMPLE 5

Samples of the product from Prep. 6–9 of Table IV and the sample from Prep. 10 on Table VI were milled and pressed at 365°–375°F. Izod impact values were determined on ⅛ in. specimens, tensile impacts on 1/16 in. specimens and tensile properties on ⅛ in. micro-tensile specimens. Table VII sets forth the results:

TABLE VII

| Product | Izod Impact (ft-lb/in) | Tensile Impact (ft-lb/in$^2$) | Tensile Strength Yield (lb/in$^2$) | Tensile Strength Break | & Elongation Yield | & Elongation Break | Modulus X 10$^{-5}$ (lb/in$^2$) |
|---|---|---|---|---|---|---|---|
| Prep. 6 | 8.2 | 50 | 4500 | 3900 | 8 | 21 | 0.71 |
| Prep. 7 | 8.1 | 42 | 4900 | 4100 | 8 | 21 | 0.68 |
| Prep. 8 | 8.3 | 60 | 4900 | 3900 | 9 | 29 | 0.69 |
| Prep. 9 | 1.5 | 50 | 3500 | 2800 | 7 | 10 | 0.67 |
| Prep. 10 | 9.2 | 45 | 5200 | 4200 | 9 | 19 | 0.72 |

The data given above clearly demonstrates the product from Prep. 9 has an inferior Izod impact to the other products. This product contains the crosslinked acrylate elastomer uncrosslinked styrene acrylonitrile copolymer listed in Table II, Prep. 5, which did not utilize a divinyl benzene crosslinking agent during the second step of the process. When a crosslinked acrylate elastomer, overcoated with a crosslinked styrene-acrylonitrile copolymer, is present in the final product, the Izod impacts, tensile strength and elongation characteristics are dramatically enhanced and the product is resistant to ultraviolet deterioration, has good impact, and can be utilized in injection molding operations, if desired.

EXAMPLE 6

This example demonstrates that under the reaction conditions described in the previous examples, the degree of grafting of styrene-acrylonitrile copolymer segments onto the crosslinked poly(n-butyl acrylate) gel is quite low.

A sample of the coagulated and dried resin from Prep. 5 was extracted with methyl ethyl ketone (MEK) at 50°C. for 16 hours and the insoluble gel was removed by centrifuge. The MEK solution was dried to recover the soluble fraction. The gel fraction constituted 71% by weight of the resin and the soluble fraction 29% by weight of the resin. The nitrogen content of the original resin before MEK extraction, of the gel and sol portions were determined and were converted to acrylonitrile in the gel and in the sol phase. The presence of acrylonitrile in the gel phase signifies that some styrene-acrylonitrile segments were attached to the poly(n-butyl acrylate) gel by grafting. These results are listed in Table VIII.

TABLE VIII

| Material | Wt.% | % Nitrogen | % Acrylonitrile | % Acrylonitrile in each phase |
|---|---|---|---|---|
| Whole resin from Prep. 5 | 100 | 1.86 | 7 | — |
| Gel | 71 | 0.22 | 0.83 | 0.59 |
| Sol | 29 | 5.62 | 21.2 | 6.15 |

These data indicate that 6.74% of the 7% of acrylonitrile was accounted for. The degree of grafting was therefore:

$$\frac{0.59}{0.59+6.15} = \frac{0.59}{6.75} = 8.8\%$$

EXAMPLE 7

This example further demonstrates the low degree of grafting of the styrene-acrylonitrile copolymer segments using a product from the 3-step phase.

The product from Prep. 9 was recovered, was dried and was exhaustively extracted with MEK. The insoluble gel was 33.7% by weight and the soluble fraction was 66.3%. The nitrogen analysis of the original resin from the 3-step process of the gel and sol fractions are listed in Table IX together with the calculation showing the degree of grafting:

TABLE IX

| Material | Wt.% | Nitrogen % | Acrylonitrile % | % Acrylonitrile in each phase |
|---|---|---|---|---|
| Resin from Prep. 9 | 100 | 5.02 | 19 | — |
| Gel | 33.7 | 1.44 | 5.45 | 1.84 |
| Sol | 66.3 | 6.37 | 24.1 | 16 |

% of total acrylonitrile accounted for - $\frac{17.84g}{19 g} \times 100\% = 94\%$ Degree of grafting - $\frac{1.84}{17.84} = 10.3\%$ Thus, under the reaction conditions described in this invention, about 10.3% of the mixture of styrene and acrylonitrile appears to be grafted onto the crosslinked poly(n-butylacrylate) network.

What is claimed is:

1. A thermoplastic composition having impact and weather resistance which comprises a crosslinked acrylate elastomer, a crosslinked styrene-acrylonitrile copolymer and a linear styrene acrylonitrile copolymer said composition being formed by a process which comprises:
    1. formation of a composition which comprises a crosslinked acrylate elastomer and a crosslinked styrene-acrylonitrile polymer by:
        a i. emulsion polymerization of at least one alkyl acrylate in the presence of at least one crosslinking agent and
        a ii. emulsion polymerization of styrene, acrylonitrile, and at least one crosslinking agent in the presence of the reaction product of 1 a i. or
        b i. emulsion polymerization of styrene and acrylonitrile in the presence of at least one crosslinking agent and
        b ii. emulsion polymerization of at least one alkyl acrylate and at least one crosslinking agent in the presence of the reaction product of 1 b i.; and
    2. either suspension or emulsion polymerization of styrene and acrylonitrile in the absence of a crosslinking agent in the presence of the composition of Step 1.

2. A composition as claimed in claim 1 wherein the amount of crosslinked acrylate elastomer in the composition ranges from about 10% to 50% by weight of the composition.

3. A composition as claimed in claim 1 wherein the crosslinked acrylate elastomer has a Tg of less than 25°C.

4. A composition as claimed in claim 1 wherein the crosslinked acrylate elastomer is selected from the group consisting of the crosslinked $C_2$–$C_{10}$ alkyl acrylates and crosslinked $C_8$–$C_{22}$ alkyl methacrylates.

5. A composition as claimed in claim 1 wherein the crosslinked acrylate elastomer is selected from the group consisting of the crosslinked $C_4$–$C_8$ alkyl acrylates.

6. A composition as claimed in claim 1 wherein the crosslinked acrylate elastomer is crosslinked n-butyl acrylate.

7. A composition as claimed in claim 1 which further comprises up to about 20% by weight of an ethylenically unsaturated compound copolymerized with the acrylate elastomer, said weight being based on the amount of acrylate.

8. A composition as claimed in claim 1 wherein the amount of crosslinked styrene-acrylonitrile in the composition range between about 5% and 35% by weight of the composition.

9. A composition as claimed in claim 1 wherein the amount of linear styrene-acrylonitrile ranges in the composition between about 15% to 85% by weight of the composition.

10. A composition as claimed in claim 1 wherein the weight ratio of styrene to acrylonitrile in the crosslinked and in the linear styrene-acrylonitrile components of the composition ranges between about 50:50 and 85:15.

11. A composition as claimed in claim 1 wherein either or both of the crosslinked styrene-acrylonitrile and the linear styrene-acrylonitrile are optionally copolymerized with 1-20% by weight of an ethylenically unsaturated monomer, said percentage being based on the weight of the styrene-acrylonitrile.

12. A composition as claimed in claim 1 wherein the amount of cross-linked acrylate ranges between about 10% and 50% by weight of the composition, the amount of crosslinked styrene-acrylonitrile ranges between about 5% and 35% by weight of the composition, and the amount of linear styrene-acrylonitrile ranges between about 15% and 85% by weight of the composition.

13. A process for the formation of a thermoplastic composition having impact and weather resistance which comprises a crosslinked acrylate elastomer, a crosslinked styreneacrylonitrile copolymer and a linear styrene-acrylonitrile, copolymer, said process comprising:
    1. formation of a composition which comprises a crosslinked acrylate elastomer and a crosslinked styrene-acrylonitrile polymer by:
        a i. emulsion polymerization of at least one alkyl acrylate monomer in the presence of at least one crosslinking agent and
        a ii. emulsion polymerization of styrene, acrylonitrile, and at least one crosslinking agent in the presence of the reaction product of 1 a i.; or
        b i. emulsion polymerization of styrene and acrylonitrile, in the presence of at least one crosslinking agent and
        b ii. emulsion polymerization of at least one alkyl acrylate monomer and at least one crosslinking agent in the presence of the reaction product of 1 b i.; and
    2. either emulsion or suspension polymerization of styrene and acrylonitrile in the absence of a crosslinking agent in the presence of the reaction product of (1).

14. A process as claimed in claim 13 wherein the amount of acrylate monomer is sufficient to produce an amount of crosslinked acrylate elastomer which equals from about 10% to 50% by weight of the composition.

15. A process as claimed in claim 13 wherein the crosslinked acrylate elastomer has a Tg of less than 25°C.

16. A process as claimed in claim 13 wherein the acrylate monomer is selected from the group consisting of the $C_2$–$C_{10}$ alkyl acrylates and $C_8$–$C_{22}$ alkyl methacrylates.

17. A process as claimed in claim 13 wherein the acrylate monomer is selected from the group consisting of the $C_4$–$C_8$ alkyl acrylates.

18. A process as claimed in claim 13 wherein the acrylate monomer is n-butyl acrylate.

19. A process as claimed in claim 13 wherein the acrylate monomer is optionally copolymerized with up to about 20% by weight of an ethylenically unsaturated monomer.

20. A process as claimed in claim 13 wherein the crosslinking agent used Step 1, is selected from the group consisting of the di- and poly-functional ethylenically unsaturated monomers having at least one vinyl group.

21. A process as claimed in claim 13 wherein the crosslinking agent in Steps 1 a i. or 1 b ii. is 1,3-butylene diacrylate.

22. A process as claimed in 13 wherein the amount of crosslinking agent in which is used in Step 1 ranges between 0.05% and 10% by weight of the combined amount of acrylate monomer and of the styrene and acrylonitrile monomers.

23. A process as claimed in claim 13 wherein the crosslinking agent in Steps 1 a ii. or 1 b i. is divinyl benzene.

24. A process as claimed in claim 13 wherein amount of styrene and acrylonitrile added in Step 1 is sufficient to produce an amount of crosslinked styrene-acrylonitrile which is equal to about 5–35% by weight of the composition.

25. A process as claimed in claim 13 wherein the amount of styrene and acrylonitrile added in Step 2 is sufficient to give an amount of linear styrene-acrylonitrile which ranges between 15% and 85% by weight of the composition.

26. A process as claimed in claim 13 wherein the weight ratio of styrene to acrylonitrile in Steps 1 and 2 ranges between 50:50 and 85:15 weight parts of styrene to acrylonitrile.

27. A process as claimed in claim 13 wherein the styrene-acrylonitrile formed in Steps 1 and 2 is optionally copolymerized with 1–20% by weight of an ethylenically unsaturated monomer.

28. A process as claimed in claim 13 wherein the amount of acrylate monomer used is sufficient to give 10%–50% by weight crosslinked acrylate elastomer in the composition, wherein the amount of styrene and acrylonitrile used in Step 1 is sufficient to give an amount of crosslinked styrene-acryloni-trile which is equal to about 5% to 35% by weight of the composition, and wherein the amount of styrene and acrylonitrile used in Step 2 is sufficient to give from 15% to 85% by weight of linear styrene-acrylonitrile.

* * * * *